Jan. 9, 1923.
P. M. SCHIBROWSKI ET AL.
COMBINED LICENSE TAG AND STOP SIGNAL MEANS.
FILED NOV. 25, 1921.
1,441,636.
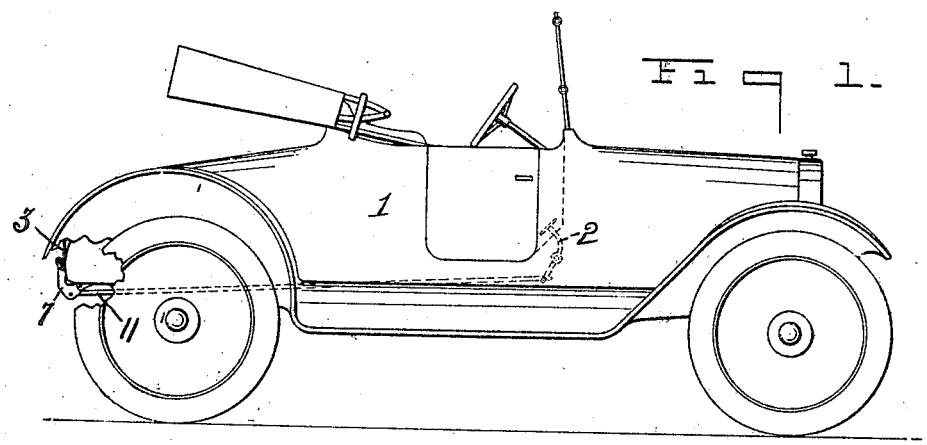
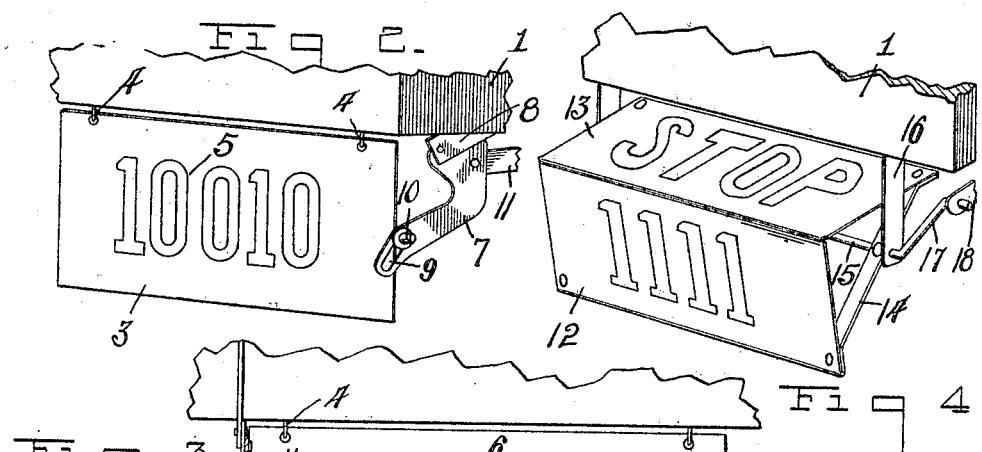
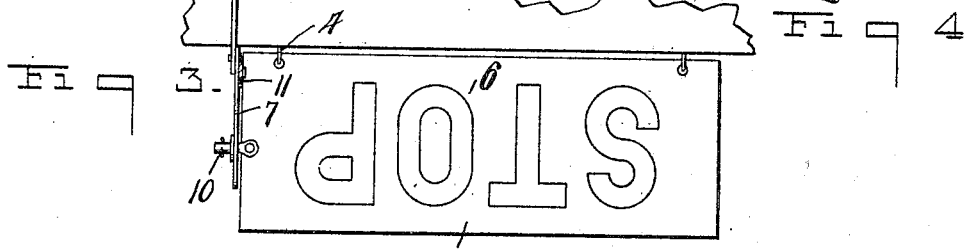
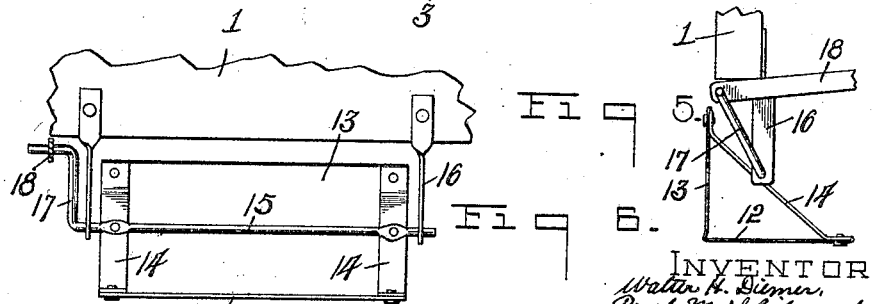
INVENTOR.
Walter H. Diemer.
Paul M. Schibrowski.
By Owen, Owen & Crampton
Attys.

Patented Jan. 9, 1923.

1,441,636

UNITED STATES PATENT OFFICE.

PAUL M. SCHIBROWSKI AND WALTER H. DIEMER, OF TOLEDO, OHIO, ASSIGNORS TO THE AMERICAN-NATIONAL COMPANY, OF TOLEDO, OHIO, A CORPORATION OF OHIO.

COMBINED LICENSE-TAG AND STOP-SIGNAL MEANS.

Application filed November 25, 1921. Serial No. 517,651.

*To all whom it may concern:*

Be it known that we, PAUL M. SCHIBROWSKI and WALTER H. DIEMER, citizens of the United States, and residents of Toledo, in the county of Lucas and State of Ohio, have made an Invention Appertaining to a Combined License-Tag and Stop-Signal Means; and we do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to stop signal devices for use particularly in connection with automobiles, juvenile vehicles, etc.

The primary object of the invention is the provision of a combination stop signal and license tag which is operable at the will of the operator or driver of the associated vehicle to display either the license tag or the stop signal.

The invention is fully described in the following specification, and while, in its broader aspect it is capable of embodiment in numerous forms, two embodiments thereof are illustrated in the accompanying drawings, in which,—

Fig. 1 is a side elevation of an automobile equipped with a signal device embodying the invention, with the device in stop signal position and with a part of the automobile broken away. Fig. 2 is an enlarged fragmentary perspective view of the rear portion of the vehicle with the signal device in license display position. Fig. 3 is an enlarged front view thereof. Fig. 4 is an enlarged fragmentary perspective view of the rear portion of a vehicle equipped with a modified form of signal device in license display position. Fig. 5 is an end view thereof, and Fig. 6 is a front or inner side view thereof.

Referring to the drawings, 1 designates an automobile or any other vehicle with which it may be desired to associate a stop signal device and which is provided with a lever 2, in the present instance, illustrated as comprising one of the foot levers of an automobile, preferably the brake lever.

A plate 3 is hung from the rear body portion of the vehicle, for instance, by means of hooks 4 for free vertical swinging movements relative to the vehicle to adapt the plate to be swung into positions to display either side thereof. The plate is provided on one side thereof with a license number 5 and on the other side thereof with a stop designation 6 so that when the plate is in its normal downward hanging position, as in the present instance, the license number will be displayed, as shown in Fig. 2, and when the plate is swung to its upright position, as shown in Fig. 1, the stop signal will be displayed.

The operating means for the plate comprises an elbow lever 7, which is pivoted at one end to the rear portion of the body, as to an arm 8, adjacent to one end of the plate 3 for vertical swinging movements in a plane longitudinally of the body. The lever extends downward and rearward from its pivot and has its free end provided with a slot 9 receiving a pin 10 projecting from the adjacent end of the plate 3 so that an upward swinging of the lever from the position shown in Fig. 2 will effect an upward swinging of the plate 3 to its upright stop signal displaying position, as shown in Fig. 1. The lever 7 is connected by a rod or link member 11 to the operating lever 2 so that a predetermined movement of the operating lever will impart an upward swinging movement to the lever 7. If the lever 2 comprises a foot operated brake lever of the vehicle, the connection should be such that a movement of the lever to brake applying position will throw the plate 3 to stop signal displaying position.

In the form of the invention illustrated in Figs. 4, 5 and 6 the license and stop signal display plate is of L-form to provide the flanges 12 and 13, which in the present instance, are provided respectively on their outer sides with the license number and stop signal. The flanges of the plate are connected at each end by a diagonal strip 14 to which a shaft 15 is centrally fixed. The outer ends of the shaft 15 are journaled in bearing arms 16, depending from the rear of the vehicle body 1, and one end of the shaft is angled to form a crank arm 17, which is connected by a link or rod 18 to the operating lever 2 in the same manner as the rod 11. It is evident with this form that when the operating lever 2 is in one position of its movement the license number display flange of the plate will stand in display position, and that when the lever 2 is moved from such position the plate will be rocked to hide the license number and display the stop signal.

With both forms of the invention the signal plate should be placed in position for the rays from a tail light to be thrown thereon so that when the plate is operated at night in the rays of the light, the movement of the same will tend to cause a flashing of the signal to attract attention.

We wish it understood that our invention is not limited to any specific construction, arrangement or form of the parts as it is capable of embodiment in numerous forms without departing from the spirit of the claims.

Having thus described our invention, what we claim as new, and desire to secure by Letters Patent, is,—

The combination with a vehicle of an angle plate having an identification mark on the outer side of one flange and a stop signal on the outer side of the other flange, a shaft carrying the plate and disposed within the angle thereof in spaced relation to the plate flanges and extending longitudinally thereof, means carried by the vehicle and forming a bearing for the shaft, and means connected to the shaft and operable to move the plate to either identification displaying or stop signal displaying position.

In testimony whereof, we have hereunto signed our names to this specification.

PAUL M. SCHIBROWSKI
WALTER H. DIEMER.